United States Patent Office.

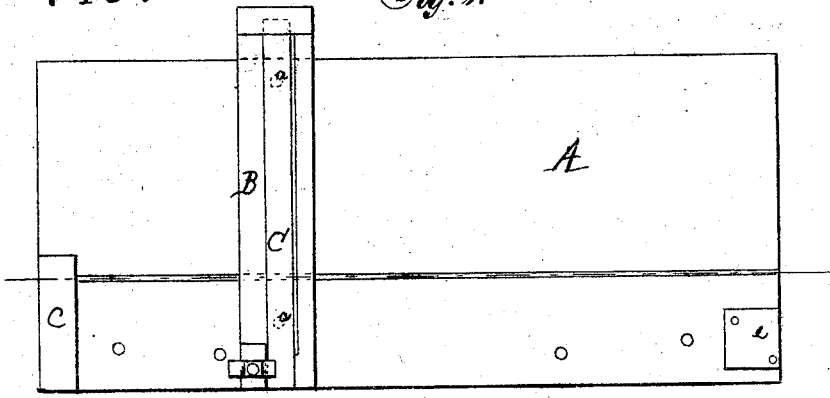
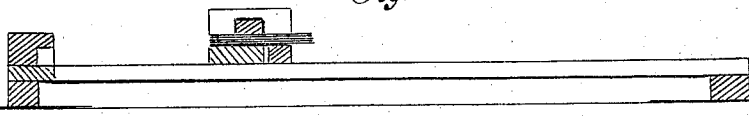
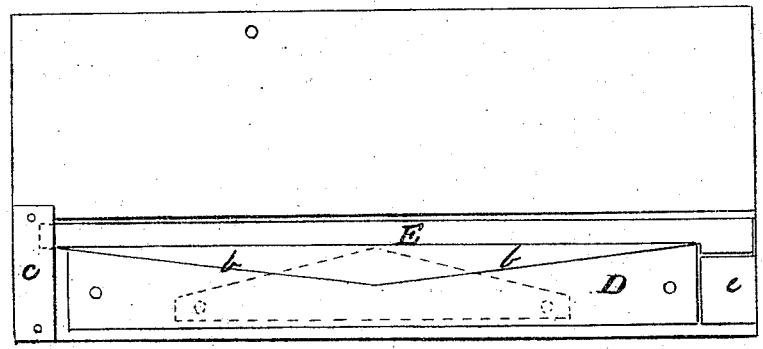
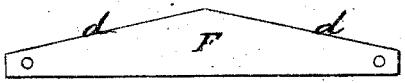

LYMAN BENNET, OF AMSTERDAM, NEW YORK.

*Letters Patent No. 74,977, dated March 3, 1868.*

IMPROVEMENT IN DEVICES FOR CUTTING OUT BANDS AND FRONTS OF DRAWERS.

*The Schedule referred to in these Letters Patent and making part of the same.*

TO ALL WHOM IT MAY CONCERN:

Be it known that I, LYMAN BENNET, of Amsterdam, in the county of Montgomery, and State of New York, have invented a new and useful Device for Cutting Bands and Fronts of Drawers; and I do hereby declare that the following is a full, clear, and exact description thereof, which will enable others skilled in the art to make and use the same, reference being had to the accompanying drawings forming part of this specification.

This invention relates to a new and improved method of cutting the fronts and bands of drawers, and it consists in an arrangement of adjustable guides for the cutting-knife and clamp or press-bar in connection therewith, for holding the cloth, the whole being arranged upon a table for the purposes designed, as will be herein more fully described.

Figure 1 represents a top or plan view of the table, with a guide and press-bar attached.

Figure 2 is a cross-section of fig. 1, through the line $x\ x$, showing the folds of cloth, in red lines, secured under the press-bar.

Figure 3 represents the guides, both for the bands and fronts, the latter in dotted lines to show its position on the table when in use.

Figure 4 is a detached view of the guide for the fronts.

Similar letters of reference indicate corresponding parts.

A is the table, made of suitable size and form for the purpose designed. B is a guide, which is secured on the table by pins, which enter holes in the table, which pins are indicated by $a\ a$. On this guide B there is a clamp or press-bar, C, which is detachable from the guide, as the guide B is detachable from the table.

In the operation of cutting, the guide B is first placed upon the table, as shown, and the cloth is secured to it under the press-bar C, which is buttoned, as seen in fig. 1. The cloth is then cut to the lengths of the bands by means of a knife, the edge of the press-bar forming a guide for the knife while cutting. When this is done, B, with the press-bar, is secured in place upon the table A, the bar B serving as a guide to the cutting-knife, and the press-bar C holding the cloth in place during the operation of cutting.

D is a guide, which is now placed on the table, and secured to it by pins or dowels, in the same manner that B was. This guide has angular edges, $b\ b$, as seen in the drawings. E is a guide for the cutting-knife, which is secured to the table at one end in a stationary block, $c$, and held to or against a stationary block at the other end, marked $e$. F is the guide for the fronts. To cut these, the guide D is removed and F is attached to the table by pins in the same manner, and the cloth is reversed, in the process of cutting, against the inclined sides $d\ d$, the same as before, so that the fronts are cut wider at one end than at the other, while the cloth is cut up evenly.

In both cases the cloth is secured under the guide E while being cut. In this manner the bands and fronts of drawers may be cut of a uniform shape and size, and in the most expeditious manner.

By the usual method of cutting bands and fronts for drawers, the cloth is folded to form some twenty or more thicknesses, and placed smoothly on a large block of wood and marked off by a pattern. The cloth thus folded is cut lengthwise and crosswise by means of a wide chisel, the handle of which is struck by a mallet or hammer.

Patterns of suitable shape are sometimes placed upon the cloth as guides, and by means of a sharp knife the cloth cut the desired shape. But by this method of cutting, the patterns frequently move to a greater or less extent, as they are held by the hand, and destroy the shape of the fronts and bands. As the knife necessarily follows the guide, any movement of the latter makes an irregular cut. By my arrangement of the guides this difficulty is avoided, as the guides are at all times held rigidly in place. I am aware that these guides may be permanently attached to a table or platform of suitable size. I do not, therefore, claim them as detachable, in the manner described; but, having thus described my invention,

What I claim as new, and desire to secure by Letters Patent, is—

The arrangement upon the table A of the guides B, D, and F, press-bar C, and knife-guide E, as herein described, for the purpose specified.

LYMAN BENNETT.

Witnesses:
   H. P. KLINE,
   H. K. BENNETT.